US005573367A

United States Patent [19]

Erickson et al.

[11] Patent Number: 5,573,367

[45] Date of Patent: Nov. 12, 1996

[54] NESTABLE CONTAINER FOR HAULING MATERIALS

[75] Inventors: Stewart E. Erickson, Hudson, Wis.; Daniel J. Halvorson, Eagan, Minn.

[73] Assignee: SEEC, Inc., Mendota Heights, Minn.

[21] Appl. No.: 340,836

[22] Filed: Nov. 16, 1994

[51] Int. Cl.[6] .................. B65G 67/02

[52] U.S. Cl. .................. 414/786; 414/342; 414/391; 414/399; 414/498

[58] Field of Search .................. 414/756, 341, 414/342, 498, 390–392, 399, 419–421; 206/515–520

[56] References Cited

U.S. PATENT DOCUMENTS

| | | | |
|---|---|---|---|
| 1,275,145 | 8/1918 | Fitch | 414/342 |
| 1,437,965 | 12/1922 | Fitch | 414/342 |
| 1,509,400 | 9/1924 | Fitch | 414/391 X |
| 3,817,415 | 6/1974 | Lewis | 414/399 X |
| 4,295,776 | 10/1981 | Payne et al. | 414/421 X |
| 4,351,448 | 9/1982 | Ingersoll et al. | 220/318 |
| 4,598,925 | 7/1986 | Riggin | 414/498 X |
| 4,826,013 | 5/1989 | Heikkinen | 206/518 |
| 4,913,301 | 4/1990 | Pickler | 414/403 |
| 4,984,962 | 1/1991 | Järvinen | 414/498 X |
| 5,105,947 | 4/1992 | Wise | 206/519 |
| 5,199,571 | 4/1993 | Wolff et al. | 206/518 |
| 5,281,073 | 1/1994 | Gesuale | 414/421 |
| 5,354,165 | 10/1994 | Booher | 414/498 |
| 5,415,517 | 5/1995 | Lanigan, Sr. et al. | 414/342 X |
| 5,421,688 | 6/1995 | Füchtey et al. | 414/399 X |

FOREIGN PATENT DOCUMENTS

| | | | |
|---|---|---|---|
| 980727 | 12/1975 | Canada | 414/392 |
| 16640 | 10/1912 | Denmark | 414/342 |
| 1277132 | 9/1968 | Germany | 414/421 |
| 145461 | 12/1980 | Germany | 414/421 |
| 40146 | 3/1980 | Japan | 414/421 |
| 260766 | 11/1926 | United Kingdom | 414/342 |

*Primary Examiner*—David A. Bucci
*Attorney, Agent, or Firm*—Fredrikson & Byron, PA

[57] ABSTRACT

The present invention provides a nestable intermodal container for hauling materials. In one embodiment, this container includes a bottom wall; a plurality of sidewalls sloped generally outwardly from the bottom wall, the sidewalls and bottom wall defining an interior of the container, and the sidewalls having an upper perimeter defining an opening that is larger that the bottom wall; lifting members attached to at least two opposing sidewalls, each of the lifting members being adapted to engage a crane and a vertical wall of a rail car. The bottom wall, sidewalls and lifting members are desirably configured so that the container may be substantially received in another substantially similar container. In a method of the invention, a number of such containers can be used. These containers are filled at a collection site, transported to a processing site located remotely from the collection site for at least a distance on the back haul leg of a rail route and emptied at the processing site. The empty containers are nested together at the processing site so that several containers may be carried on a single rail car, and the nested containers are hauled on a minority of rail cars of a train and non-waste material is hauled on a majority of rail cars of the train back to the collection site.

8 Claims, 18 Drawing Sheets

NESTABLE CONTAINER FOR HAULING MATERIALS

The present invention relates to an intermodal container and method for hauling materials in such a container in rail cars on the back haul leg of a dedicated rail line.

BACKGROUND

The U.S. and other industrialized nations are producing large amounts of industrial and residential solid waste. Much of this waste is Municipal Solid Waste ("MSW") which is waste that is generally produced in or near large metropolitan areas. The overwhelming majority of MSW is deposited in landfills or treatment centers near the metropolitan areas. The landfill space in many metropolitan areas, however, is being depleted much faster than new landfill space is being made available. Moreover, many landfills that serve metropolitan areas are at or near capacity, so large waste producing cities are having to transport their waste to disposal sites located elsewhere.

The disposal sites for MSW are ideally located where land is inexpensive, opposition to disposing waste is minimal and there is enough space to acquire more land for expansion in the future. Such disposal sites are generally located in very remote areas that may be 350 to 2000 miles from the metropolitan centers. Current apparatuses and methods for hauling MSW, however, are inefficient and costly which limits the distance that the waste can be hauled away from the metropolitan centers.

Large amounts of industrial waste other than MSW also present environmental problems and recycling opportunities. Waste from pulp and paper mills, commonly called paper mill sludge, is an excellent fertilizer for tree farms. Yet, paper mill sludge is difficult to haul and tree farms are often located in mountainous regions far away from the mills. Another recyclable industrial waste is auto-fluff, which is a light-weight material that is often organic and useful as plant fertilizer. Auto-fluff is also difficult to haul because it is quite bulky and requires exceptionally large cargo holds to haul significant quantities. As with the MSW, current apparatuses and methods for hauling these materials are inefficient and costly.

One current method of waste disposal is to haul the waste in trucks from staging areas in the city to landfill sites in nearby areas. Hauling MSW in trucks is the most costly and limiting method of transporting MSW away from metropolitan centers because trucks have a relatively limited capacity and are expensive to operate compared to bulk hauling systems. Accordingly, since trucking MSW is expensive, hauling large quantities of MSW away from metropolitan centers to distant landfills in trucks is unfeasible for most cities.

A second apparatus and method of disposing of MSW is to use barges to haul it away from metropolitan centers. Barging MSW is also a costly method of transportation, and it is limited to hauling MSW to areas near deep water passageways. Barges are additionally limited because certain fluid wastes can cause catastrophic environmental damage if any such waste is spilled into the water. Accordingly, barging MSW away from metropolitan centers is also unfeasible for hauling MSW to remote disposal sites.

Another method and apparatus for hauling MSW is to use intermodal containers on the front haul leg of a dedicated train route. Generally, a dedicated train route hauls a certain type of material in one direction (the front haul leg), and then the rail cars return empty in the other direction (the backhaul leg). Large rectangular intermodal containers are currently being stacked on flatbed rail cars in a "double-decker" configuration. The intermodal containers are filled with MSW at staging areas in metropolitan centers, and then the filled intermodal containers are hauled on trucks to a rail line. The filled intermodal containers are loaded onto flatbed rail cars and hauled to a disposal site, which is usually located a great distance away from a metropolitan center. Once the filled intermodal containers arrive at the disposal center, they are emptied, washed and reloaded onto the flatbed rail cars. The empty intermodal containers are then hauled back to the metropolitan centers where they are refilled with more MSW.

Although hauling MSW on the front haul leg of a dedicated train route is more cost-effective than using trucks or barges, entire trains must haul empty intermodal containers back to the metropolitan centers. The intermodal containers must be hauled back empty because MSW fouls the containers so that they cannot haul anything else. Moreover, using the front haul leg of a dedicated train route is the most expensive method of transporting materials by rail. Accordingly, hauling MSW over long distances on trains is generally still too expensive for many cities.

The cost of hauling materials by rail is greatly reduced by using the backhaul leg of a dedicated train route because railroad companies charge significantly less for using the backhaul leg. However, back hauling MSW on rail cars is currently unfeasible because the MSW will contaminate and foul the cars, which impairs the ability to use the cars for their intended purpose on the front haul leg. Therefore, a need exists for providing an apparatus and method for back hauling MSW on rail cars away from metropolitan centers that is efficient and cost-effective.

SUMMARY OF THE INVENTION

The invention is a nestable intermodal container for use in trains, planes, trucks, barges and ships, and a method for using the container. The container includes a bottom wall and sidewalls extending upwardly and sloped outwardly therefrom. The sidewalls have an upper portion terminating at an upper perimeter defining an opening to the container. Lifting members, each having a fitting for engaging a lifting means and a flange for engaging the vertical wall of a rail car, are attached to the sidewall. The opening of the container is larger than the bottom wall so that the container may substantially receive another substantially similar container in a nested state.

The nestable intermodal container is configured so that it has maximal capacity and may be easily inserted into a gondola rail car, while also being nestable within another similar container when they are empty so that more empty nested containers can be hauled on a single rail car than filled, un-nested containers. As such, fewer railcars are necessary to haul the empty nested containers back to where they are filled with materials compared to containers that cannot be nested together, thereby making other rail cars available for hauling materials.

One method of the invention includes providing the nestable intermodal container of the invention and filling it with a material such as MSW at a collection site. The containers are then transported on the backhaul leg of a dedicated train route from the collection site to a disposal site located remotely from the collection site. The containers are emptied, nested together and loaded onto a smaller number of rail cars at the disposal site. Non-waste material is loaded onto a majority of the railcars, and the non-waste material and the empty nested containers are then hauled on the front haul leg of a train route to the metropolitan centers.

DETAILED DESCRIPTION OF A PREFERRED EMBODIMENT

Figure 1:
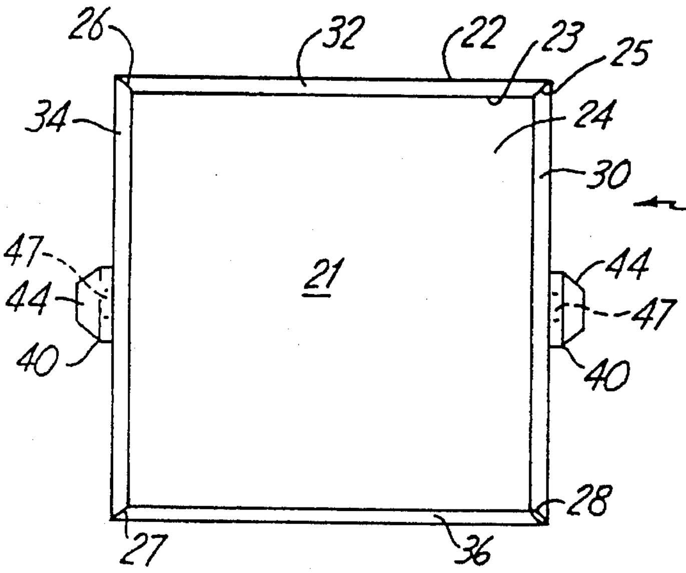
FIG. 1 is a top elevation view of a nestable container according to the invention.

FIG. 1 depicts a top view of one embodiment of a nestable container 20. The nestable container 20 is well suited for transporting a wide variety of materials, including, but not limited to, Municipal Solid Waste ("MSW"), sewage sludge, paper mill sludge, auto-fluff, contaminated soil, industrial waste and other non-waste materials, such as packaged goods, lumber, automobiles, and the like. The container may be used in large cities or at individual sources of waste.

The container 20 includes a bottom wall 24 and a plurality of sidewalls 30, 32, 34, 36, which extend generally upwardly and outwardly from the bottom wall 24. The bottom wall 24 and sidewalls 30, 32, 34, 36 may be made from generally rigid materials such as metals, plastics, composites, wood, or any combination thereof. In one preferred embodiment, the bottom wall 24 and sidewalls 30, 32, 34, 36 are made from rectilinear aluminum panels. In other embodiments, the bottom wall 24 may be made from a curved or circular panel and the sidewalls may be made from one or more panels shaped to extend upwardly from the bottom wall.

Figure 2:
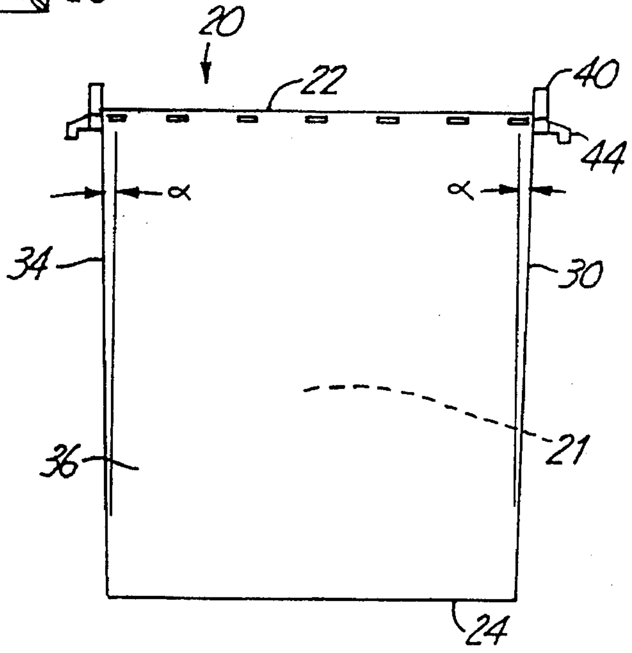
FIG. 2 is a front elevation view of the container of FIG. 1.
Figure 3:
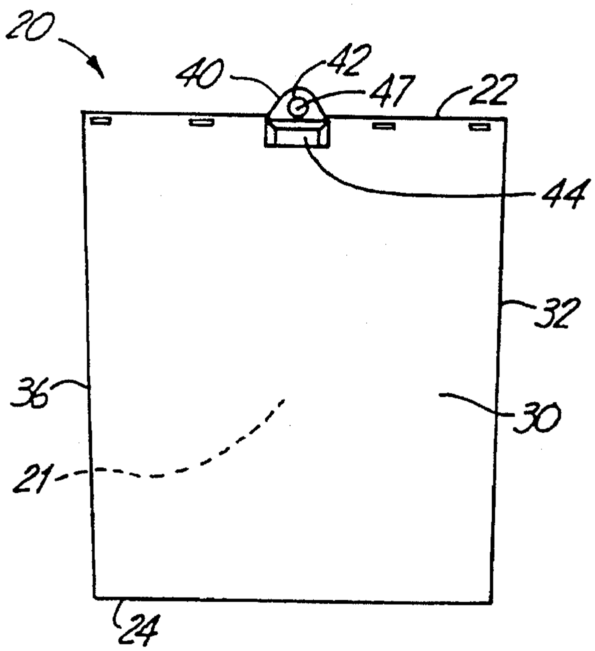
FIG. 3 is a side elevation view of the nestable container of FIG. 1.

Referring to FIGS. 1–3, the sidewalls 30, 32, 34, 36 may be separate panels that are attached to the bottom wall 24 along a seam 23. Sidewall 30 is then connected to sidewall 32 along a comer union 25, sidewall 32 is connected to sidewall 34 along comer union 26, sidewall 34 is connected to sidewall 36 along comer union 27, and sidewall 36 is connected to sidewall 30 along corner union 28. When the sidewalls 30, 32, 34, 36 are individual panels, the corner unions may be welded joints or bolted joints. The assembled sidewalls 30, 32, 34, 36 and the bottom wall 24 define an interior cavity 21 and an upper perimeter edge 22.

Each of the sidewalls 30, 32, 34, 36 extends upwardly and are sloped outwardly from the bottom wall 24 at an angle α with respect to a vertical plane that is normal to the bottom wall 24 along seam 23. By inclining the sidewalls 30, 32, 34, 36 at an angle α, the opening defined by the top perimeter 22 of the sidewalls is larger than the perimeter of the bottom wall 24 defined by seam 23. Accordingly, a nestable container 20 may be substantially received in another similar nestable container when the receiving container is empty. The angle of inclination α is preferably 2°–30° to maximize the capacity of the cavity 21. The angle of inclination α, however, is not limited to 2°–30° and may be some other value depending upon the specific use of the container 20.

In another embodiment, the sidewalls 30, 32, 34, 36 are made from a single panel that is either molded, bent or otherwise shaped to be attached to the bottom wall 24 and extend upwardly and slope outwardly therefrom. In this embodiment, the corner unions 25, 26, 27, 28 may be contiguous bends in the material such that the sidewalls do not need to be welded or bolted together.

The invention is not limited to having four sidewalls and, accordingly, any number of panels may be used to define the interior cavity 21. By way of example only, and without limiting the scope of the invention, the container 20 may have six or eight sidewalls made from almost any number of panels that correspond to a bottom wall 24 shaped like a hexagon or octagon, respectively. Also by way of example, the sidewall may be a single panel shaped like an inverted cone to correspond to a circular bottom wall 24. When the sidewall is shaped like an inverted cone, it will be appreciated that such a sidewall does not have comer unions.

In one embodiment, the entire container 20 may be molded from any suitable material so that the bottom wall 24 and the sidewalls 30, 32, 34, 36 are integrally formed as a single piece. When the container is molded, the corner union 25, 26, 27, 28 and the seam 23 are integral extensions of the corresponding adjoining walls. Materials suitable for molding the container 20 include, but are not limited to, metals and polymers.

Figure 4:
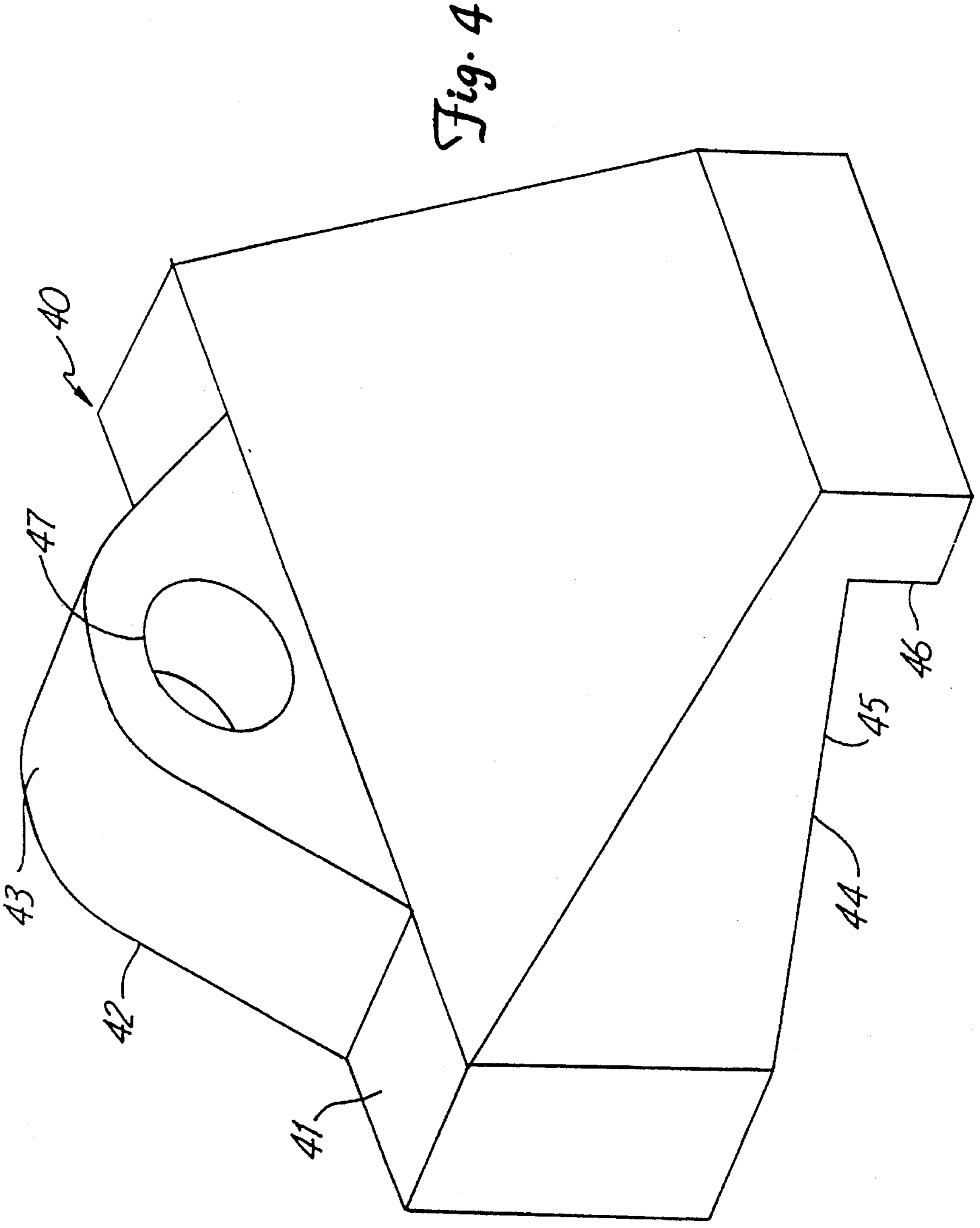
FIG. 4 is a perspective view of a lifting member in accordance with an embodiment of the invention.

The nestable container 20 carries at least one lifting member 40 for engaging a lifting mechanism, such as a crane (not shown). In a preferred embodiment, sidewall 30 and sidewall 34 each carry a lifting member 40. Referring to FIG. 4, the lifting member 40 includes a fitting 42 for engaging the lifting mechanism and a flange 44 for engaging the upper surface of a vertical sidewall of a railcar. The fitting 42 may have an opening 47 extending through a plate 43. The shape of the opening 47 may be made to correspond to the shape of the fitting used by the lifting means that engages the lifting member 40. The flange 44 may include a bottom surface 45 for engaging the top surface of a vertical wall of a railcar and downwardly depending lip 46 for restraining the lateral movement of the container 20 with respect to the railcar.

The lifting member 40 is preferably welded or bolted to a sidewall of the container 20. In another embodiment, the lifting member 40 may be formed integrally with the sidewall. The type of connection used for attaching the lifting member 40 to a sidewall is a function of the maximum weight that the container 20 is to lift. It will be appreciated that the sidewalls 30, 34 may need to be reinforced in order to handle the stresses caused by the lifting members as the container 20 is lifted with extremely heavy loads. Such reinforcement should be as thin as possible to minimize the space between the containers when they are nested in one another, thereby maximizing the number of containers that may be nested within one another within a given space.

Figure 5:
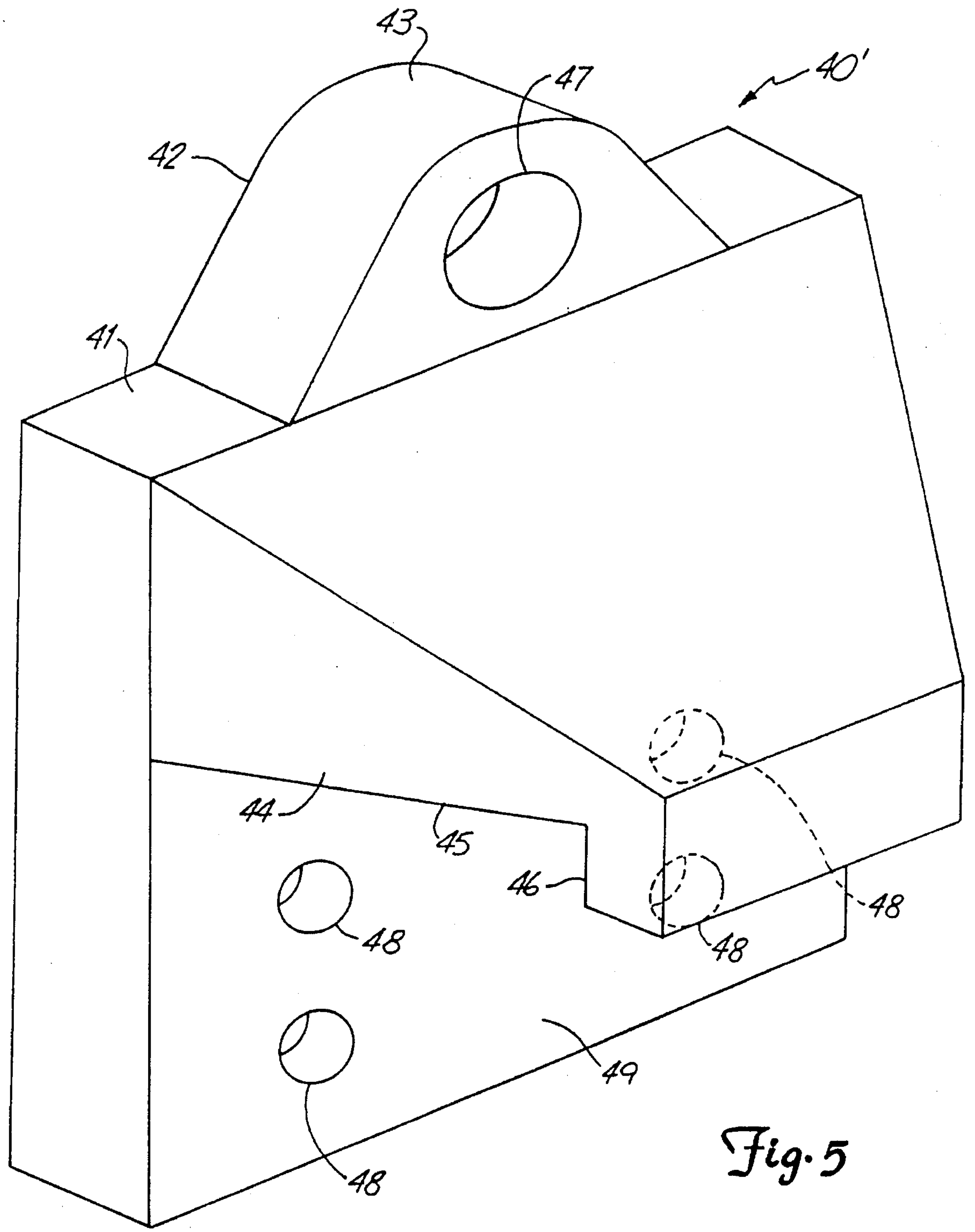
FIG. 5 is a perspective view of another lifting member in accordance with an embodiment of the invention.

FIG. 5 shows an embodiment of an adjustable lifting member 40' which may be vertically positioned along a sidewall. The adjustable lifting member 40' includes a plate 49 depending downwardly from the back of the flange 44 in which a number of holes 48 are positioned in vertical columns towards the edge of the plate 49. The number of holes 48 in each column may vary from two, as shown in FIG. 5, to several more depending upon the amount of adjustment necessary to adapt the container to a specific type of railcar. The adjustable lifting member 40' is attached to a sidewall by placing bolts or threads studs through a horizontal row of holes 48, and threadedly securing nuts to the bolts or studs. To adjust the position of the adjustable lifting member 40' along the sidewall, the bolts or studs are merely positioned through a different row of holes 48.

Figure 6A:
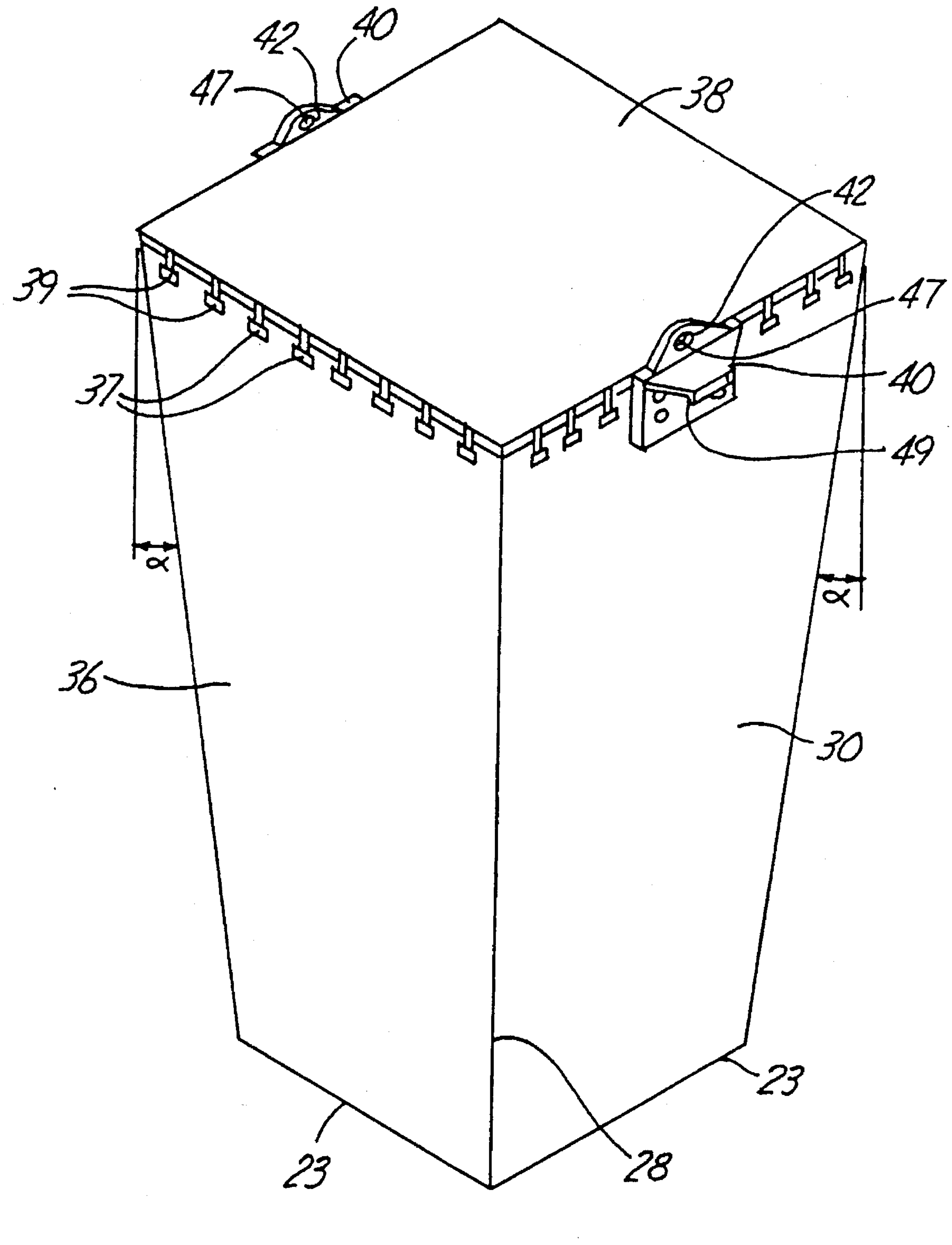
FIG. 6A is a perspective view of a nestable container in accordance with the invention.

FIG. 6A depicts an embodiment of the container 20 having two adjustable lifting members 40' and a removable cover 38 such as a tarp. The cover 38 includes a number of fasteners 39 which engage moorings 37 placed around the upper perimeter 22 of sidewalls 30, 32, 34, 36. The cover 38, may-be made from a flexible material having sufficient durability, such as rubber, canvas or nylon.

Figure 6B:
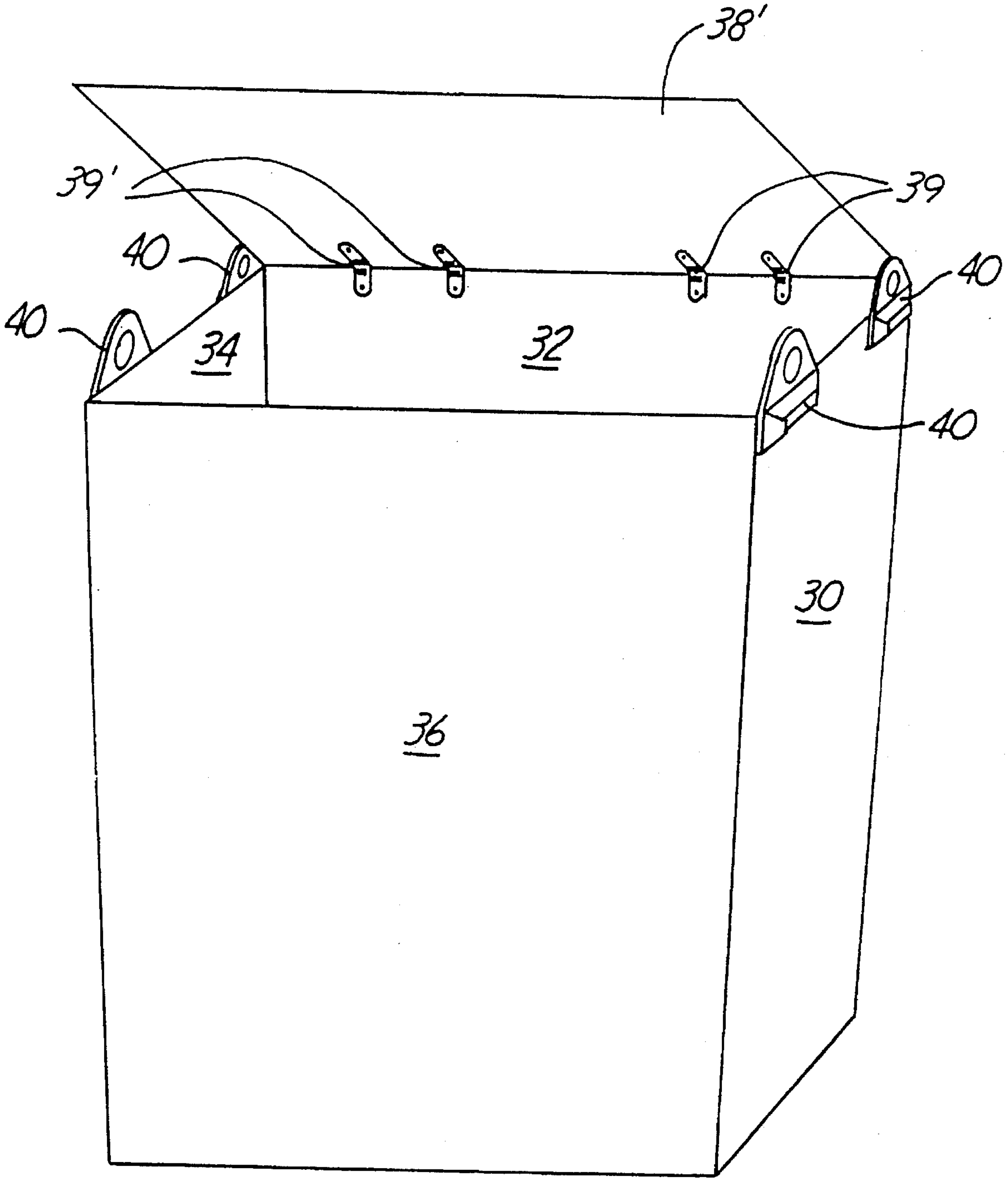
FIG. 6B is a perspective view of another nestable container in accordance with the invention.

FIG. 6B shows another embodiment in which the cover is a rigid lid 38' that extends over the top of the container 20 and is hingedly connected to either sidewall 32 or 36 by a number of hinges 39'. In still another embodiment (not shown), two rigid lids may extend approximately over one-half of the top of the container 20 and be hingedly connected to each of sidewall 32 and sidewall 36.

Figure 7:
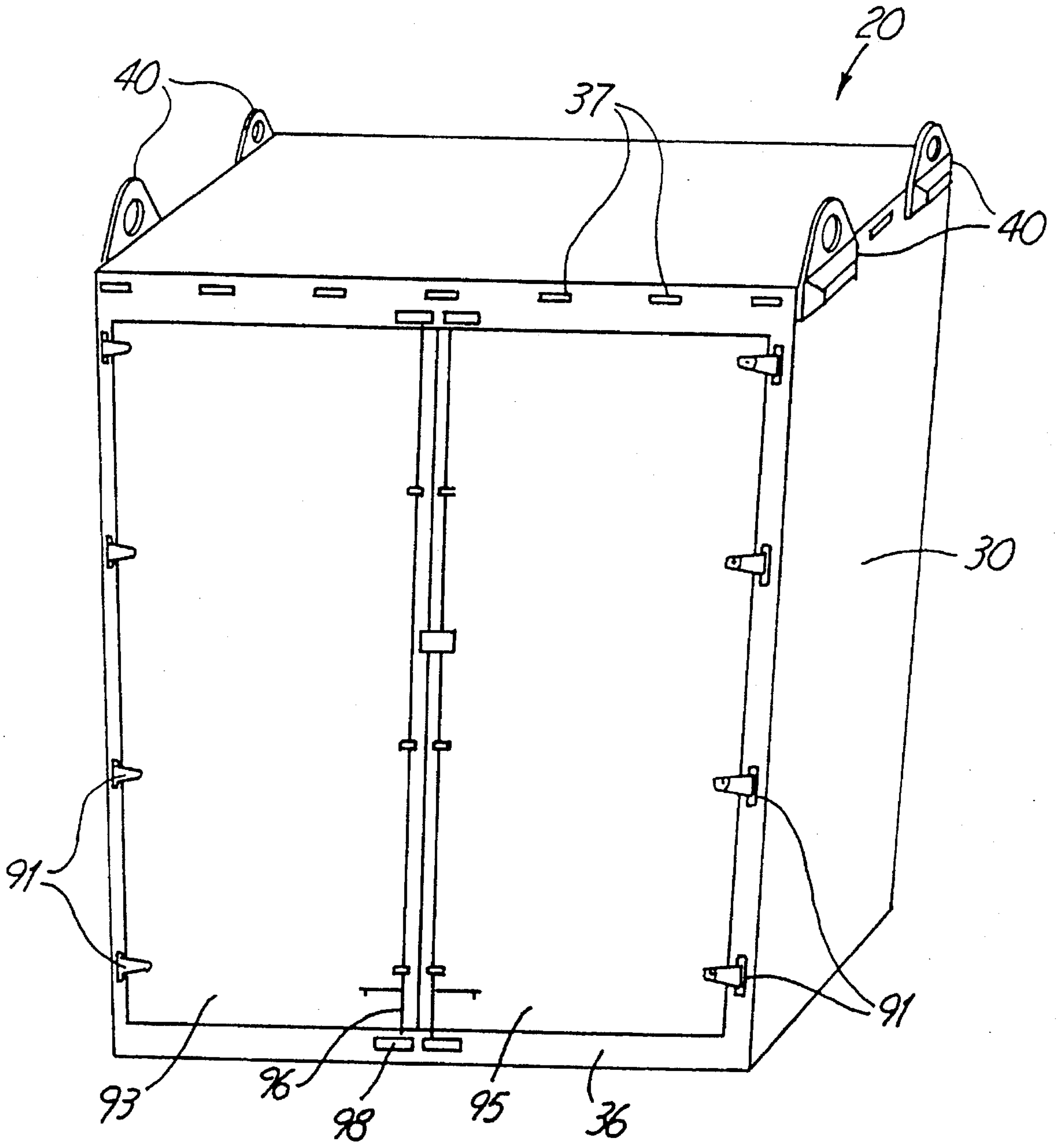
FIG. 7 is a perspective view of another nestable container in accordance with the invention.

FIG. 7 depicts an alternative embodiment of the container 20 having doors 93, 95 in one of the sidewalls. The doors 93, 95 may be double doors hingedly attached to the sidewall with heavy duty hinges 91, and secured in a closed position by positioning a vertical rod 96 and catch 98. When the doors are open, the size .of the opening is large enough to receive the forks of a fork lift, which makes the container 20 with doors 93, 95 particularly useful for loading foods stuffs or finished goods on pallets.

Figure 8:
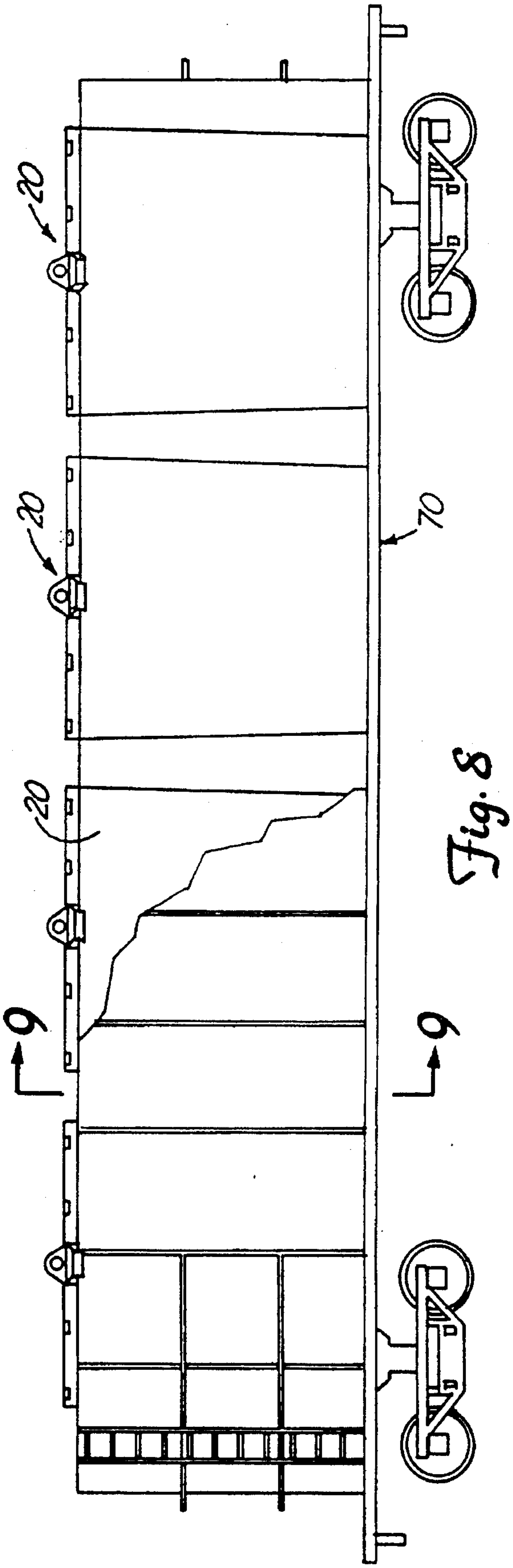
FIG. 8 is a depicts a cut-away view of a number of nestable containers in accordance with the invention in a flatbed gondola railcar.

The container 20 is designed to be used in most rail cars including, but not limited to, flatbed gondola cars, regular flatbed railcars, bath tub gondola cars and chip cars. The containers 20 may also be used in other modes of transportation including, but not limited to, trucks, ships and barges. FIG. 8 depicts a number of containers 20 in a flatbed gondola car 70 having two sidewalls 72 extending vertically upwardly from a floor 74. The size and shape of the containers may be designed to adapt to the internal structure of the railcar. In one preferred embodiment, the bottom wall 24 and upper perimeter 22 are rectilinear in shape and sized so that the container can fit between the internal cross-members of a gondola railcar. Depending upon the type of gondola car, two to four un-nested containers 20 are preferably carried by a single gondola car, but the invention is not limited to hauling any specific number of un-nested containers in a single car.

Figure 9:
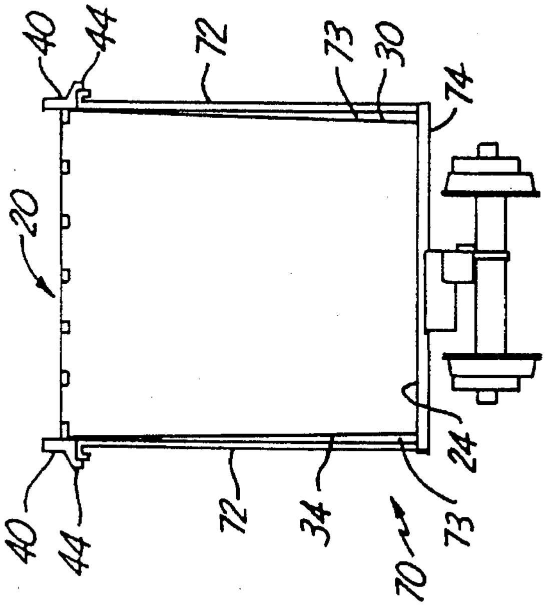
FIG. 9 is a cross-sectional view of a container in accordance with the present invention in a flatbed gondola railcar.

FIG. 9 depicts a container 20 positioned within the interior of a flatbed gondola railcar 70. The sidewalls, bottom wall and lifting member of the container 20 are configured so that the bottom surface 45 of the flange 44 of the lifting member 40 engages the top surface of the vertical walls 72 of the railcar as the bottom wall 24 is supported by the floor 74. The sidewalls 30, 34 are slightly inclined so that the container 20 may be easily inserted into the railcar 70 without sacrificing a significant percentage of hauling capacity. The angle of inclinations of the sidewalls 30, 34 is adjusted to maximize the capacity of each container 20 while also being able to provide enough inclination so that the containers 20 may be more easily inserted into the railcar 70. Accordingly, the space 73 between the sidewalls 30 and 34 and the vertical walls 72 should generally be minimized.

Figure 10:
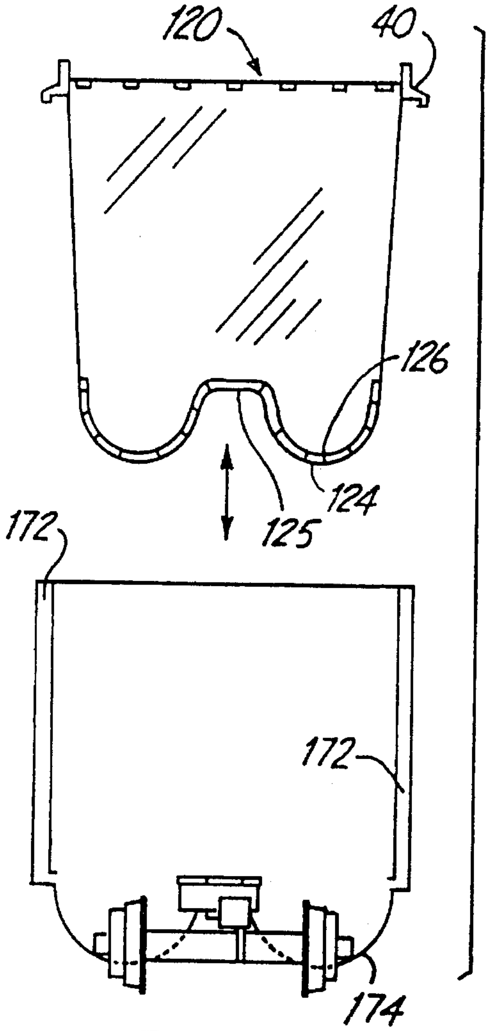
FIG. 10 is a front elevational view of a bath tub gondola railcar and a nestable container adapted to fit therein in accordance with the present invention.
Figure 11:
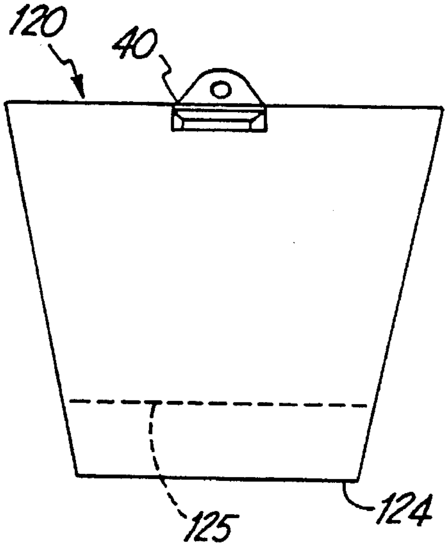
FIG. 11 is a side elevational view of the nestable container of FIG. 10.

FIGS. 10 and 11 show an alternative embodiment of a container 120 for use in bath tub gondola rail cars. The container 120 has a floor 124 with a raised section 125 for receiving the center sill of a double bottom bath tub railcar. The floor 124 is shaped to conform to the bottom 174 of a bath tub gondola rail car 170, and may include a reinforced panel 126. The panel. 126 is preferably shaped to mate with the floor 124 to provide additional support for the container.

Figure 13A:
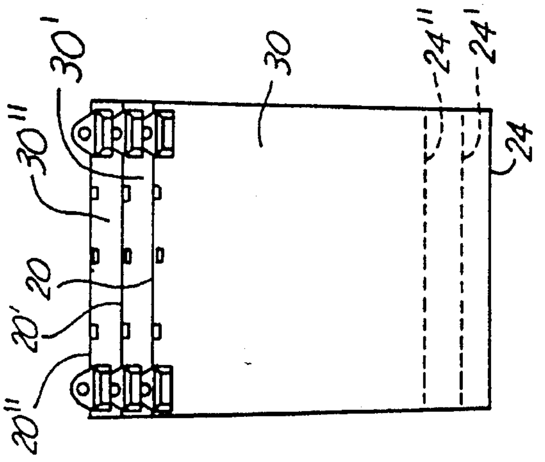
FIG. 13A is a side elevational view of a number of nestable containers in accordance with the present invention in a nested state.
Figure 12A:
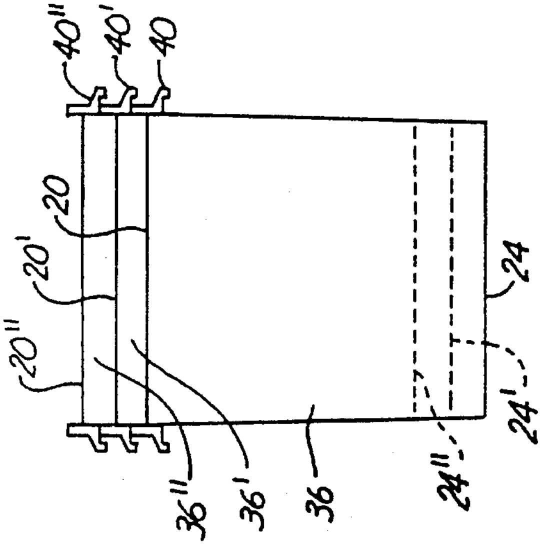
FIG. 12A is a front elevational view of a plurality of nestable containers in accordance with the present invention in a nested state.
Figure 13B:
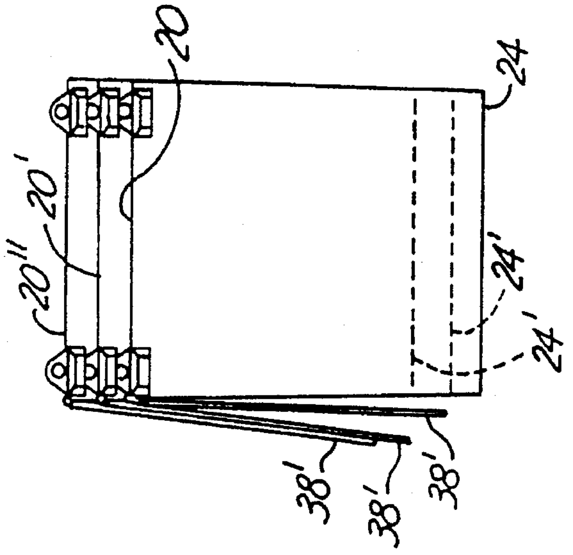
FIG. 13B is a side elevational view of a number of nestable container having rigid lids in a nested state.
Figure 12B:
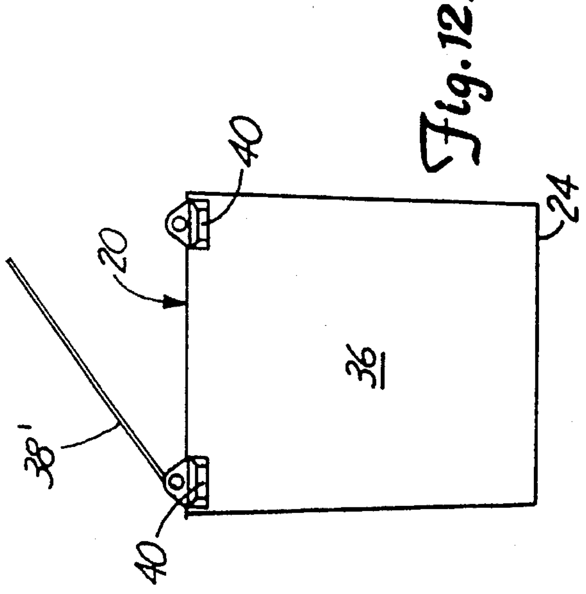
FIG. 12B is a front elevational view of a nestable container having rigid lids in accordance with the present invention.

Referring to FIGS. 12A–14A, empty containers may be nested together so that a container 20" is substantially received within another substantially similar container 20'. It will be appreciated that any number of containers may be nested together such that container 20" is nested within container 20', container 20' is nested within container 20, and so on. As shown in FIGS. 12 and 13, the containers may be nested within one another when they are empty because the bottom wall 24 is smaller than the opening defined by the upper edge 22. One container 20 may be nested within another until the interior surface of the sidewalls of the outer container are adjacent the exterior surface of the sidewalls of the inner container.

Figure 14A:
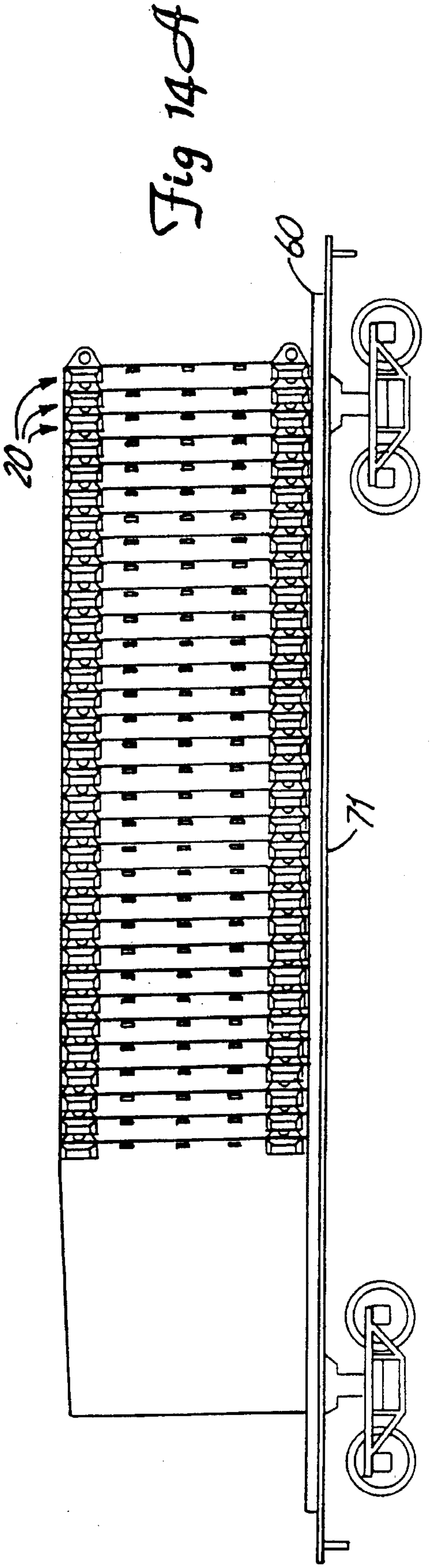
FIG. 14A depicts several nestable containers in accordance with the present invention in a nested state on a flatbed railcar.
Figure 14B:
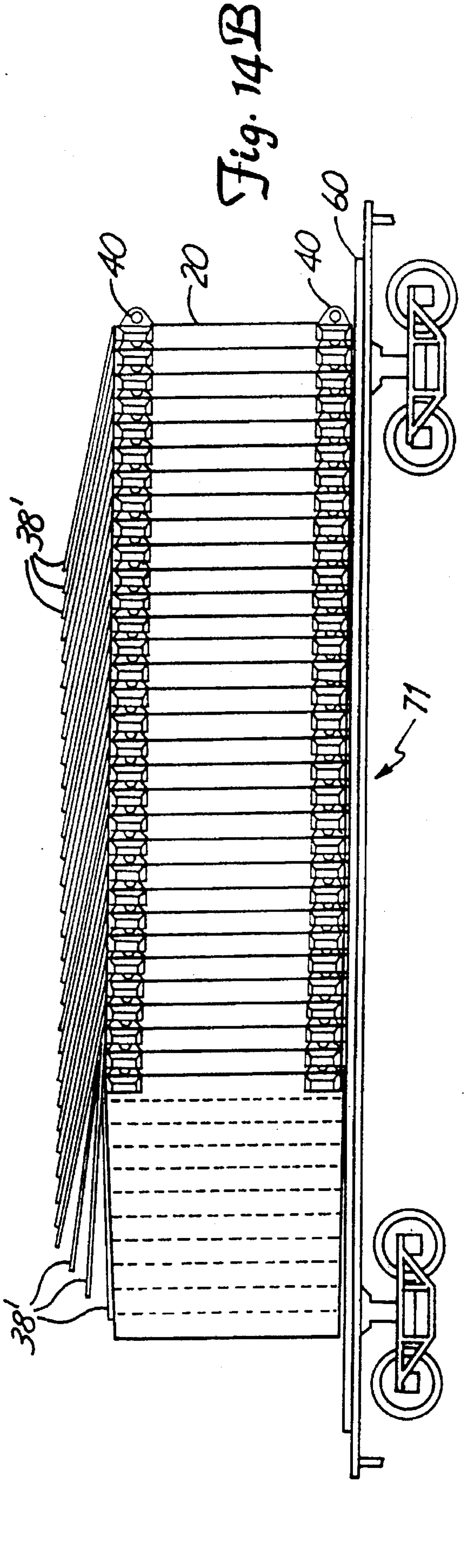
FIG. 14B depicts several nestable container having rigid lids in accordance with the present invention in a nested state on a flatbed railcar.

FIGS. 14A and 14B depicts a large number of containers 20 nested within one another, and arranged on their sides so that the bottom walls and openings are positioned substantially vertical. In one embodiment, the empty containers 20 may be nested within one another and arranged on their sides on a platform 60, and then the entire platform may be lifted onto a single flatbed railcar 71. When flexible cover 38 are used with the containers 20, the covers 38 may be folded and stored in the end container that does not have another container nested therein. The number of empty nested containers carried by a single railcar is significantly greater than the number of filled un-nested containers. As such, fewer railcars are required to haul the empty containers back to where they are filled, which allows the remaining railcars to be used for hauling materials in the same direction.

FIGS. 12B–14B depict a number of empty containers 20 having rigid lids 38' in a nested state as described with respect to FIGS. 12A–14A. The containers 20 with rigid lids 38' nest very well, and as shown in FIG. 14B, these containers may be loaded onto a platform 60 on the side of the containers without hinges.

Figure 15:
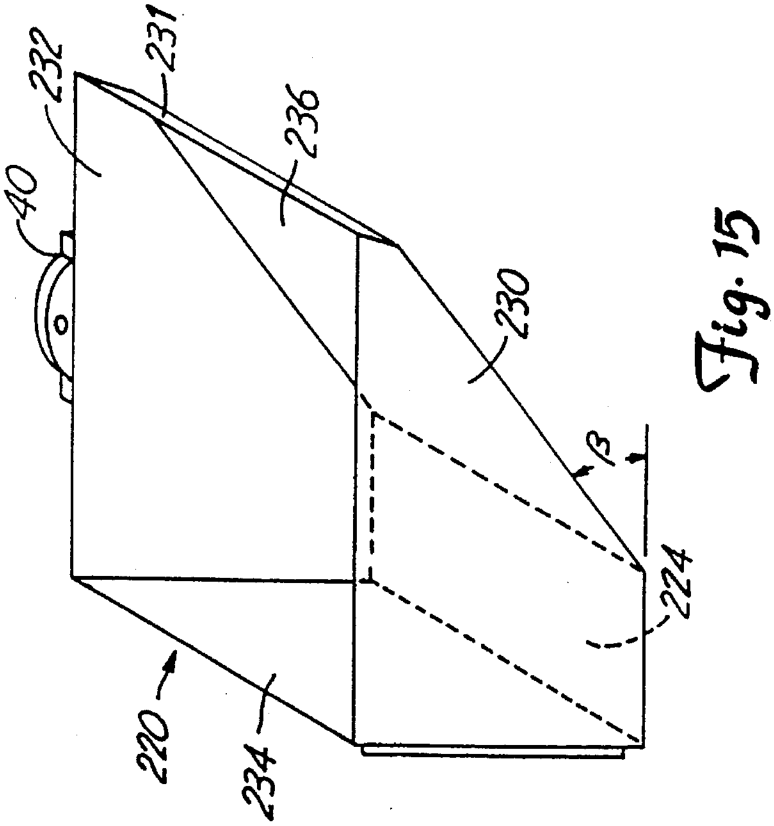
FIG. 15 is a perspective view of another nestable container in accordance with the invention.

Another embodiment of the invention is shown in FIG. 15, in which a container 220 has at least one vertical endwall 234. The container 220 preferably has a bottom wall 224, a vertical endwall 234 normal to the bottom wall 224, and three inclined sidewalls, first sidewall 230, second sidewall 232 and third sidewall 236. The sidewalls 230, 232, 236 extending upwardly and outwardly from the bottom wail 224. The inclined sidewalls 230, 232, 236 extend outwardly from the bottom wall 224 at an angle $\beta$ with respect to the plane of the bottom wall 224. The angle $\beta$ shown is preferably in the range of 45°–87°. The angle $\beta$ for the container 220 is generally larger than the angle $\alpha$ for the container 20 because the endwall 234 does not provide any space for receiving another container in a nested state, and this space must be provided by the inclination of the other walls. A lifting member 40 may be attached to sidewalls 230, 232 in the same manner as described with reference to the container 20.

Figure 16:
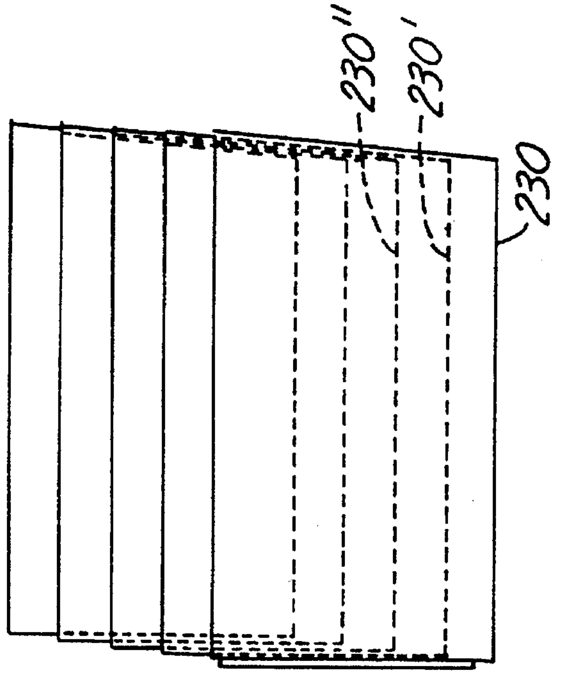
FIG. 16 is a side elevational view of a number of nestable containers of FIG. 15 in accordance with the invention in a nested state.

The containers 220 may be nested as shown in FIG. 16. The containers 220 are particularly useful when doors (not shown) positioned in the endwall 234 because the endwall 234 is not inclined and the doors do not tend to swing open.

Figure 17:
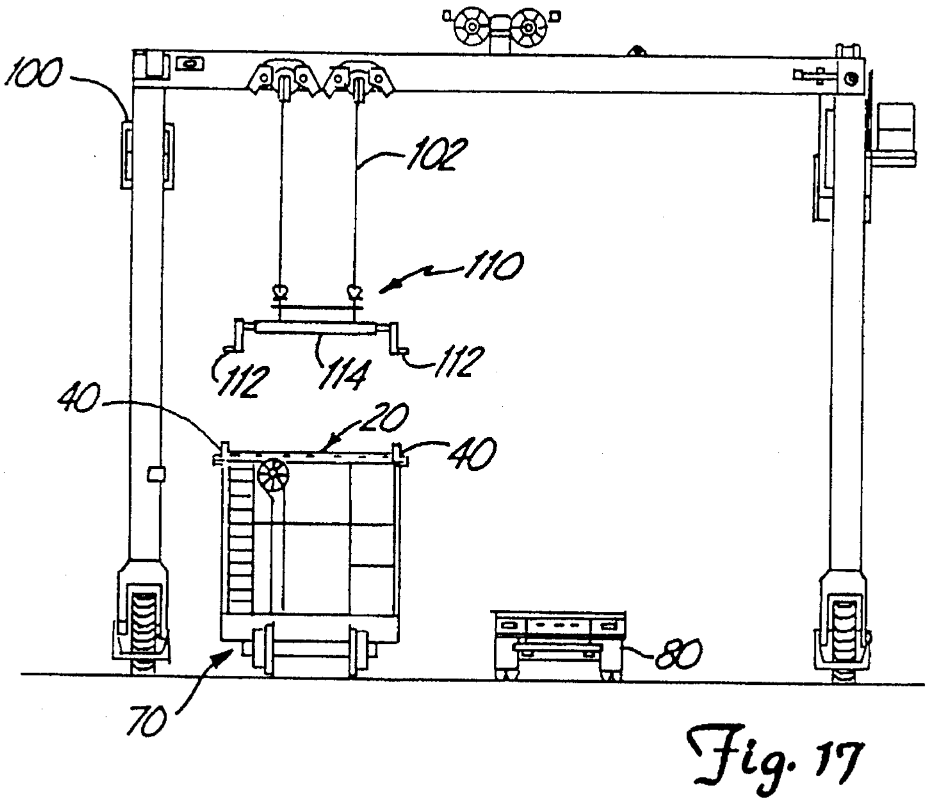
FIG. 17 depicts a lifting means and a nestable container in accordance with the present invention.
Figure 18:
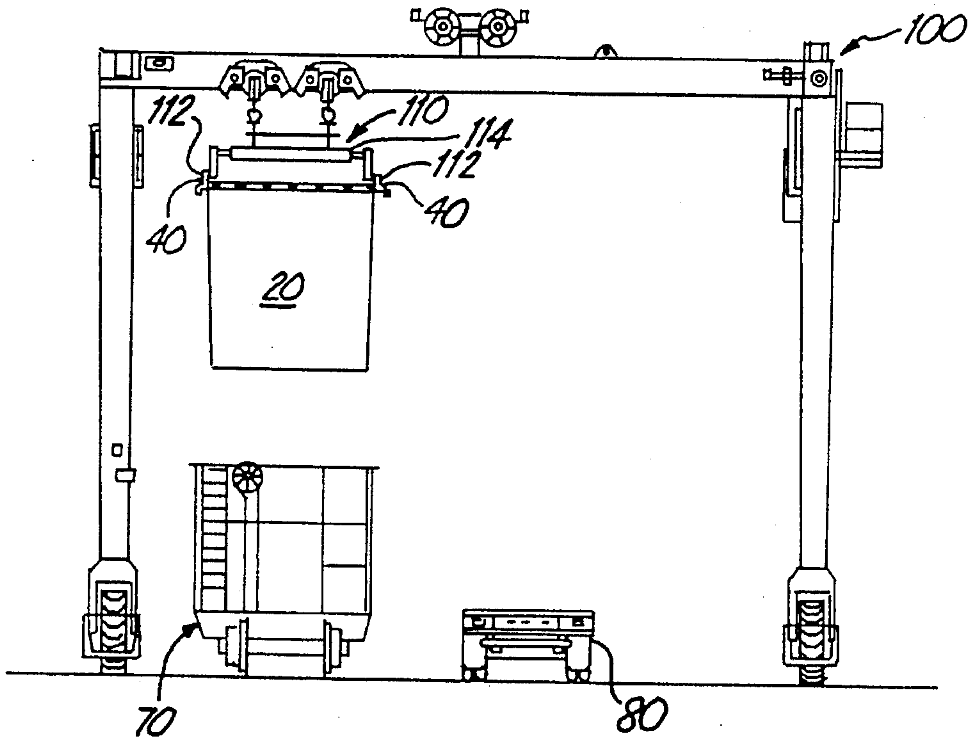
FIG. 18 depicts a lifting means lifting a container in accordance with the present invention.

Referring to FIGS. 17 and 18, a filled nestable container 20 is depicted being unloaded from a railcar 70 and onto a flatbed truck 80. A lifting means 100, which may be a gantry crane as shown, carries an engagement bar 110. The engagement bar includes a housing 114 and reciprocating fittings 112 that move in opposite directions with respect to each other along the longitudinal access of the housing 114. The reciprocating fittings may be pin-like extensions as shown in FIGS. 17 and 18 that engage the lifting members, or they may be suction cups that engage a flat surface such as a rigid lid 38' or a sidewall. The reciprocating fittings may be actuated by any mechanical actuator (not shown) such as, but not limited to, hydraulic cylinders, pneumatic cylinders or electro-mechanical actuators. The engagement bar 110 is raised or lowered with respect to the lifting means 100 by cables 102.

In a preferred embodiment, a container 20 is unloaded from a railcar 70 by retracting the pin-like reciprocating fittings 112 and lowering the engagement bar 110 so that the reciprocating fittings 112 are positioned in alignment with the fittings 42 of the lifting member 40. The reciprocating fittings 112 are then moved outwardly into engagement with the fittings 42 of the lifting member 40. By retracting cables 102, the engagement bar 110 and container 20 are raised out of the railcar 70 as shown in FIG. 18. The container can then be moved horizontally and lowered onto a flatbed truck 80. It will be appreciated that the container 20 is truly an intermodal container as it can be hauled on most any type of freight transporting vehicle such as railcars, barges and/or trucks.

Figure 20:
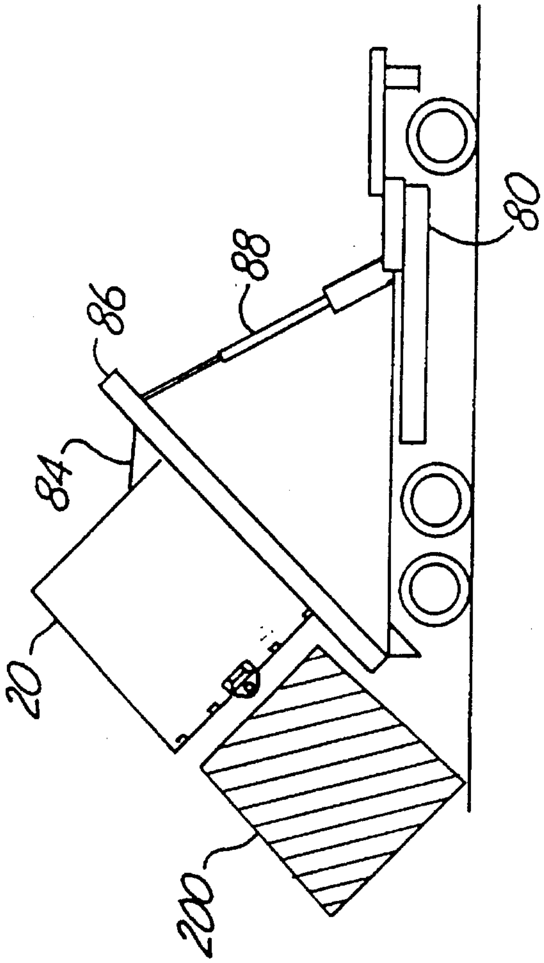
FIG. 20 depicts a nestable container of the present invention discharging materials.
Figure 19:
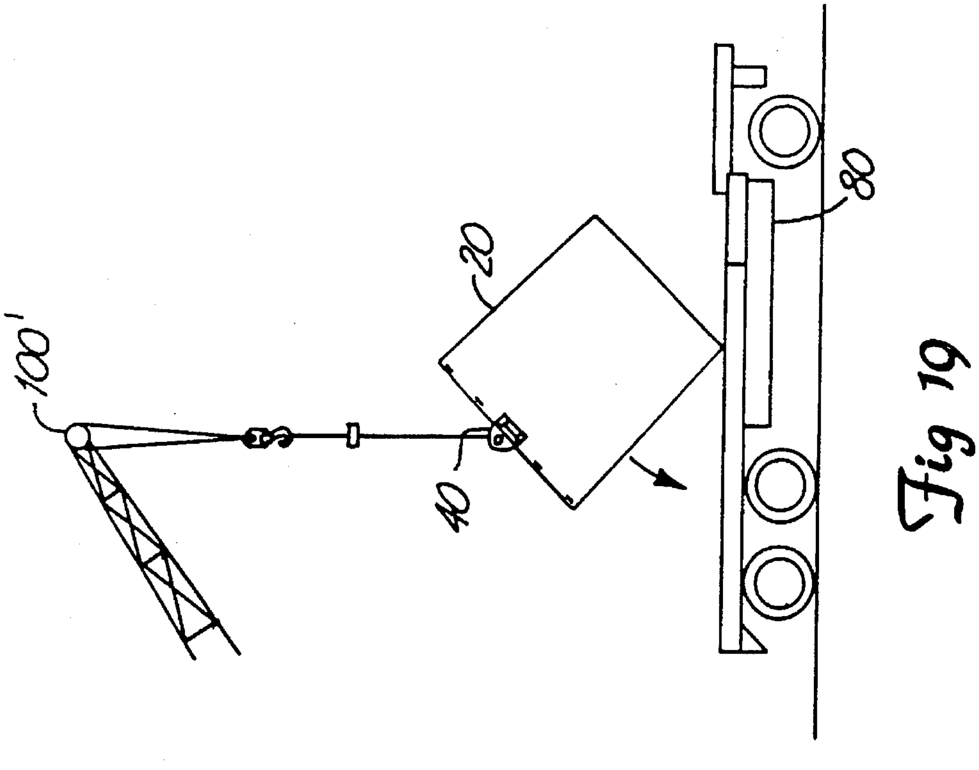
FIG. 19 depicts a lifting means tipping a nestable container in accordance with the present invention.
Figure 24:
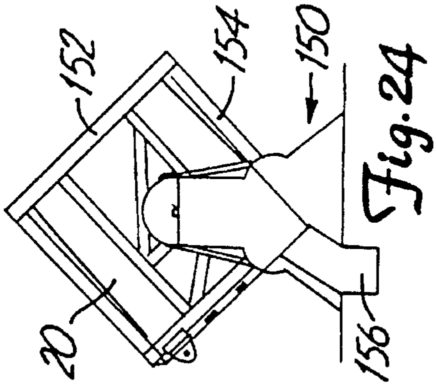
FIG. 24 depicts a nestable container in accordance with the present invention on a mechanical inverter.
Figure 23:
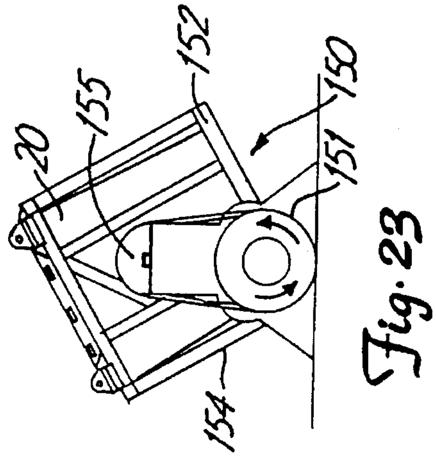
FIG. 23 depicts a nestable container in accordance with the present invention on a mechanical inverter.
Figure 22:
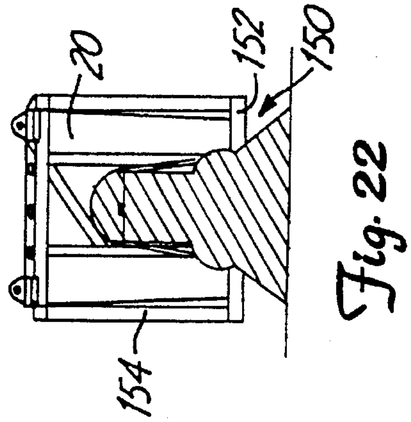
FIG. 22 depicts a nestable container in accordance with the present invention on a mechanical inverter.
Figure 21:
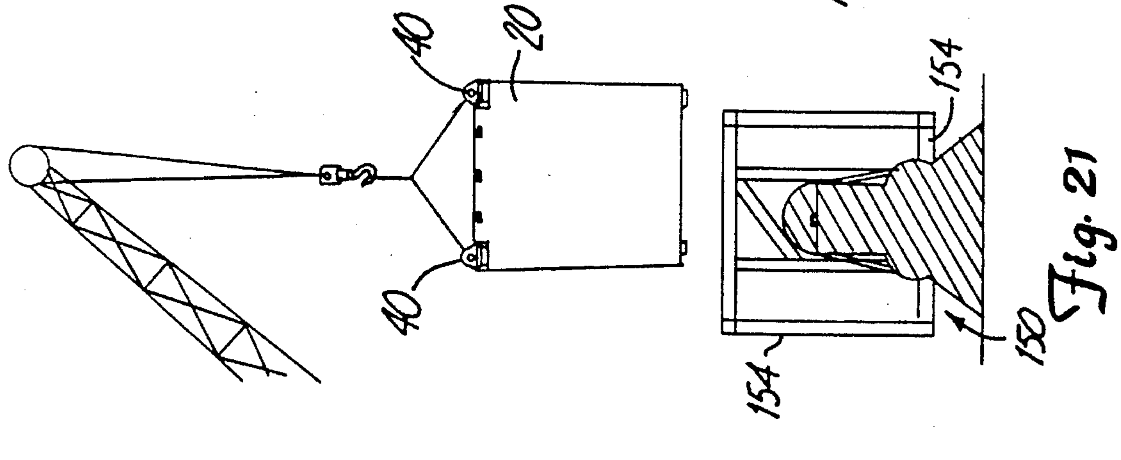
FIG. 21 depicts a nestable container in accordance with the present invention on a mechanical inverter.

FIGS. 19 and 20 depict one way of discharging a bulk material 200 such as MSW from the container 20. A lifting means 100' engages the lifting member 40 of the container 20 and tilts the container 20 over onto its side on a bed 86 of a flatbed truck 80. The bed 86 of the truck 80 is then inclined under the action Of a cylinder 88 and while the container 20 is secured to the bed 86 by a tether 84. Once the bed 86 has been sufficiently raised, the bulk material 200 will be gravitationally-discharged from the container 20.

FIGS. 21–24 depict another apparatus and method for discharging materials from the container 20. A mechanical inverter 150 is provided having a platform 152 and a backwall 154. The container 20 may be lifted from a transportation vehicle by a lifting means 100' and placed onto the platform 152. The container 20 is positioned on the mechanical inverter so that one of its sidewalls rests against the backwall 154, and then it is secured to the mechanical inverter 150 using clamps, tie-downs or other suitable securing means. The inverter 150 includes a drive wheel 151, a platform wheel 155 connected to the structure of the platform 152, and a chain 153 engaging both the drive wheel 151 and the platform wheel 155. The platform 152 and backwall 154 are inverted by rotating the drive wheel 151, which rotates the platform wheel 155 via the chain 153. The contents of a container 20 are discharged through a chute 156 when the platform 152 and backwall 154 are sufficiently inverted.

The container 20 is not limited to hauling MSW or other bulk materials. Many non-waste materials, including packaged foods, durable goods and raw goods may be hauled in the containers of the invention to protect such materials from exterior elements during transportation. The container 20 is particularly useful for hauling packaged food stuffs, electrical goods and new automobiles because many of these items may be damaged during rail transportation from the factories to the distributors.

Figure 25:
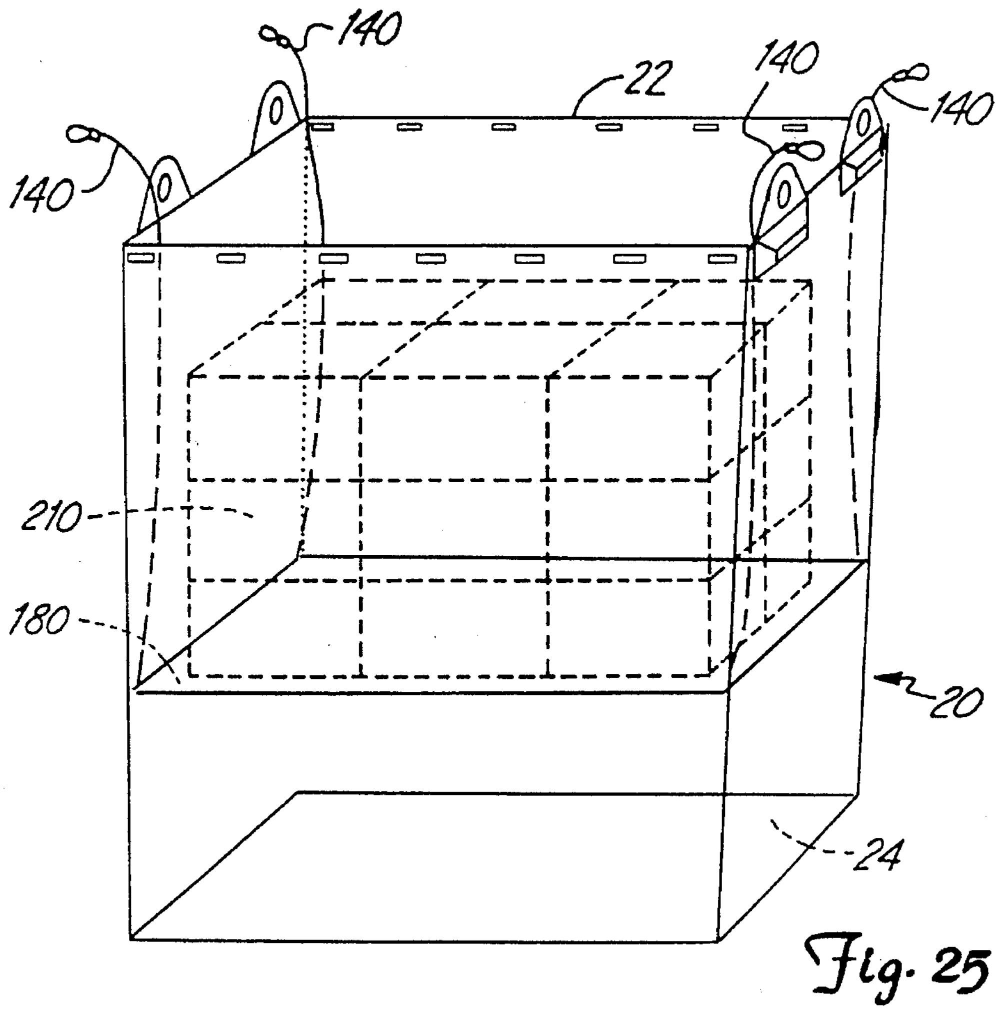
FIG. 25 depicts another embodiment of a nestable container in accordance with the present invention for hauling non-waste materials.

Referring to FIG. 25, a removable platform 180 having a number of lifting cables 140 is received within the container 20. The platform 180 may be a rigid plate that is substantially the same size as the bottom wall 24 of the container 20. The lifting cables 140 may be straps, rope or wire rope that may be positioned to be engaged by a lifting means (not shown). By providing a removable platform 180, the container 20 may be adapted to haul non-waste items that must be selectively set in the containers as opposed to being dumped into the containers like bulk materials. Processed and packaged food stuffs 210 are one such non-waste item contemplated being hauled in the container 20. Using food stuffs as an example without limiting the scope of the invention, a number of boxes of processed comestibles 210 are loaded into the container 20 by first removing the platform 180 from the container, and then positioning the comestibles 210 onto the platform. A lifting means then engages the lifting members 140 and lifts the platform 180 and the comestibles 210 over the opening 22, and lowers the platform 180 and comestibles 2 10 into the container 20. The above-described process is simply reversed to remove selectively positioned items from the container 20.

Figure 26:
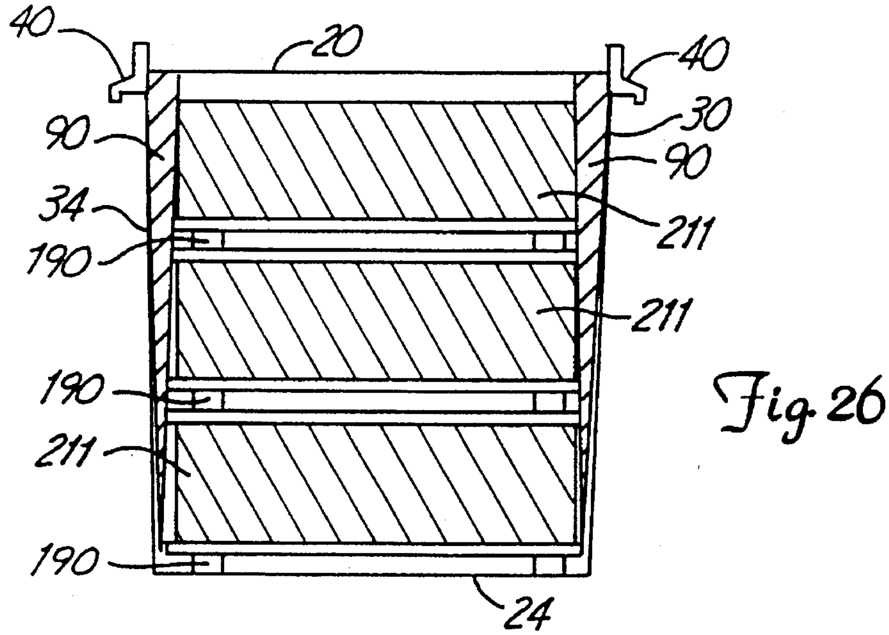
FIG. 26 depicts another embodiment of a container in accordance with the present invention for hauling non-waste materials.

Referring to FIG. 26, stackable finished products such as lumber or packaged items 211 are depicted being hauled in the container 20. Stackable items may be positioned on pallets 190 and then placed in the container using any suitable lifting means such as a crane and cables. Once the stackable items 211 are positioned within the container 20, a number of shims 90 may be positioned between the stackable items 211 and the walls 30, 32, 34, 36 of the container 20. In one embodiment, the shims 90 are wedges that are slid in between the stackable items 211 and the sidewalls of the container. In another embodiment, the shims 90 are inflatable dunnage bags that are positioned between the stackable items 211 and the sidewalls of the container 20 in a deflated state, and then inflated to secure the stackable items within the container. One particularly useful shim 90 is a wedge called Foam Bones™.

Figure 27A:
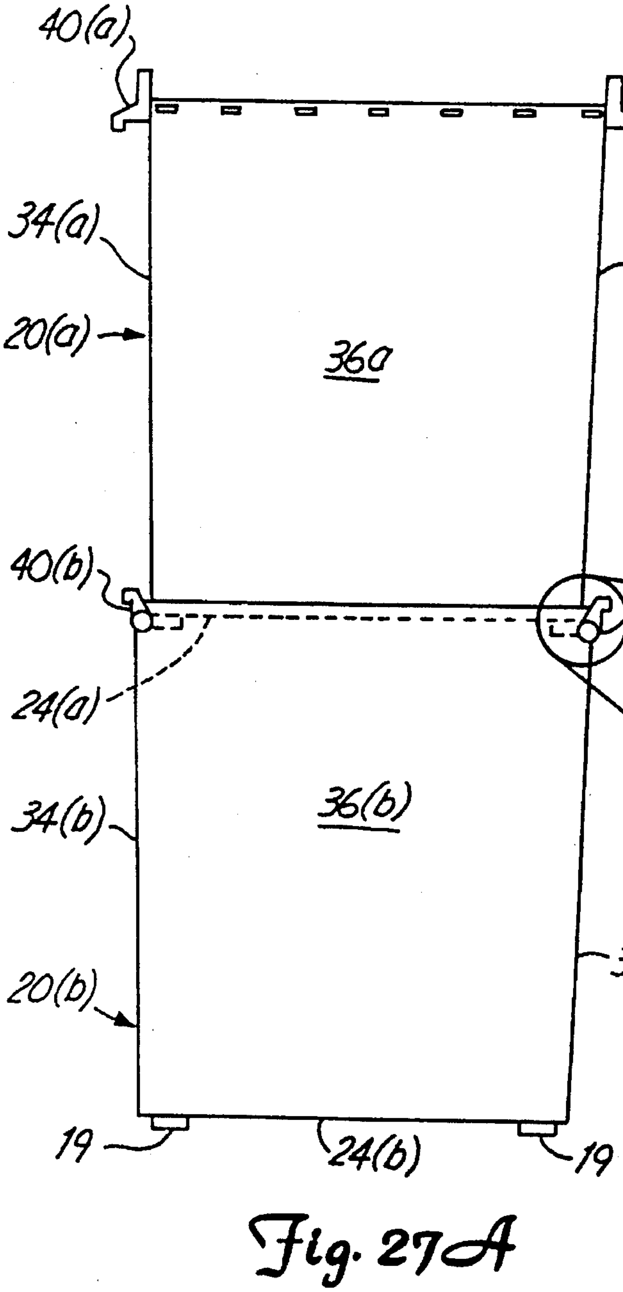
FIG. 27A is a front elevational view of a number of nestable containers in accordance with the present invention in a stacked configuration.
Figure 27B:
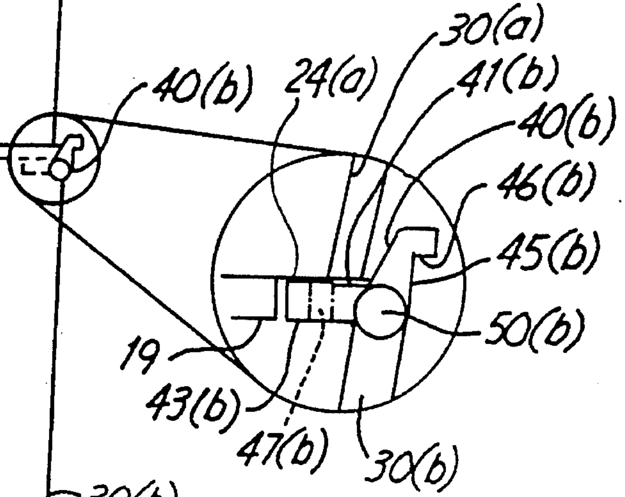
FIG. 27B is a cut away view of a rotatable lifting member supporting a nestable container in a stacked configuration in accordance with the invention.
Figure 31:
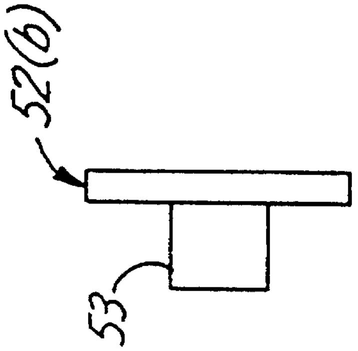
FIG. 31 is a top view of another stacking support to provide support for stacking the containers in accordance with the present invention.
Figure 32:
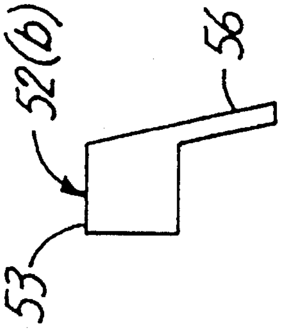
FIG. 32 is an elevational side view of the stacking support of FIG. 32.
Figure 29:
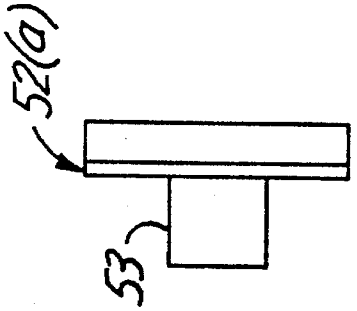
FIG. 29 is a top view of the stacking support of FIG. 29.
Figure 30:
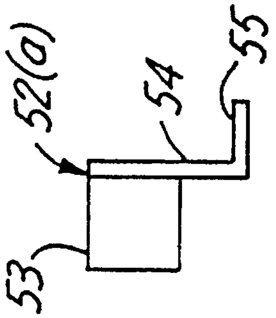
FIG. 30 is a side elevational view of the stacking support of FIG. 29.
Figure 28:
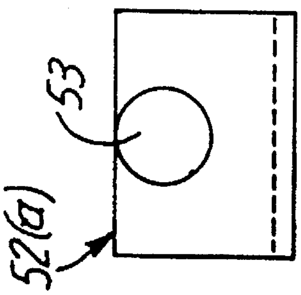
FIG. 28 is a front elevational view of a stacking support to provide support for stacking the containers in accordance with the present invention.

The containers of the invention may also be stacked on top of each other as shown by container 20(*a*) and 20(*b*) in FIGS. 27A and 27B. In order to be stacked, the lower container 20(*b*) includes stacking supports for engaging the upper container 20(*a*). The stacking supports may be either a hingedly connected rigid cover 38' as shown in FIG. 6B, rotatable lifting members 40(*a*) or removable platforms engageable with the opening 47 of the fixed lifting members 40.

The rotatable lifting members 40(*a*) are the same as the fixed lifting members 40, except that the rotatable lifting members 40(*a*) rotate about a shaft 50 between a vertical position as shown on the upper container 20(*a*) and horizontal position as shown on the lower container 20(b). The rotatable lifting members 40(*a*) may be locked in the vertical position to nest the containers or allow a crane to engage the openings 47 in the plate 43, or they may be locked in the horizontal position to stack the containers. When thee containers are stacked, the bottom wall 24 of the upper container 20(*a*) rests upon the upper face 40 of the plate 43.

FIGS. 28–32 shows two removable platforms 52(*a*) and 52(*b*) in accordance with the invention. In the embodiment shown if FIGS. 28–30, the removable platform 52(*a*) includes a pin 53 and a flange 54 depending downwardly therefrom. A lip 55 extends substantially horizontally from the lower portion .of the flange 54. In another embodiment shown in FIGS. 31 and 32, a platform 52(*b*) includes an inclined plate 56 extending downwardly from the pin at an angle the is substantially the same as the angle of inclination of the sidewalls of the container.

The platforms 52(*a*) or 52(*b*) operate by inserting the pin 53 into the opening 47 of a lifting member 40 so that the platforms are positioned on the inside of the container. The platforms 52(*a*) or 52(*b*) are preferably used on containers having four lifting members 40 and, accordingly, one platform is positioned in each of the lifting members so that the platforms are positioned in each comer of the container. Other combinations of platforms, such as a single platform on one of the sides with a lifting member may also be used. It will be appreciated that the platform 52(*a*) engages the bottom wall and that the platform 52(*b*) engages the sidewall of an upper container.

Figures 33A, 33B:
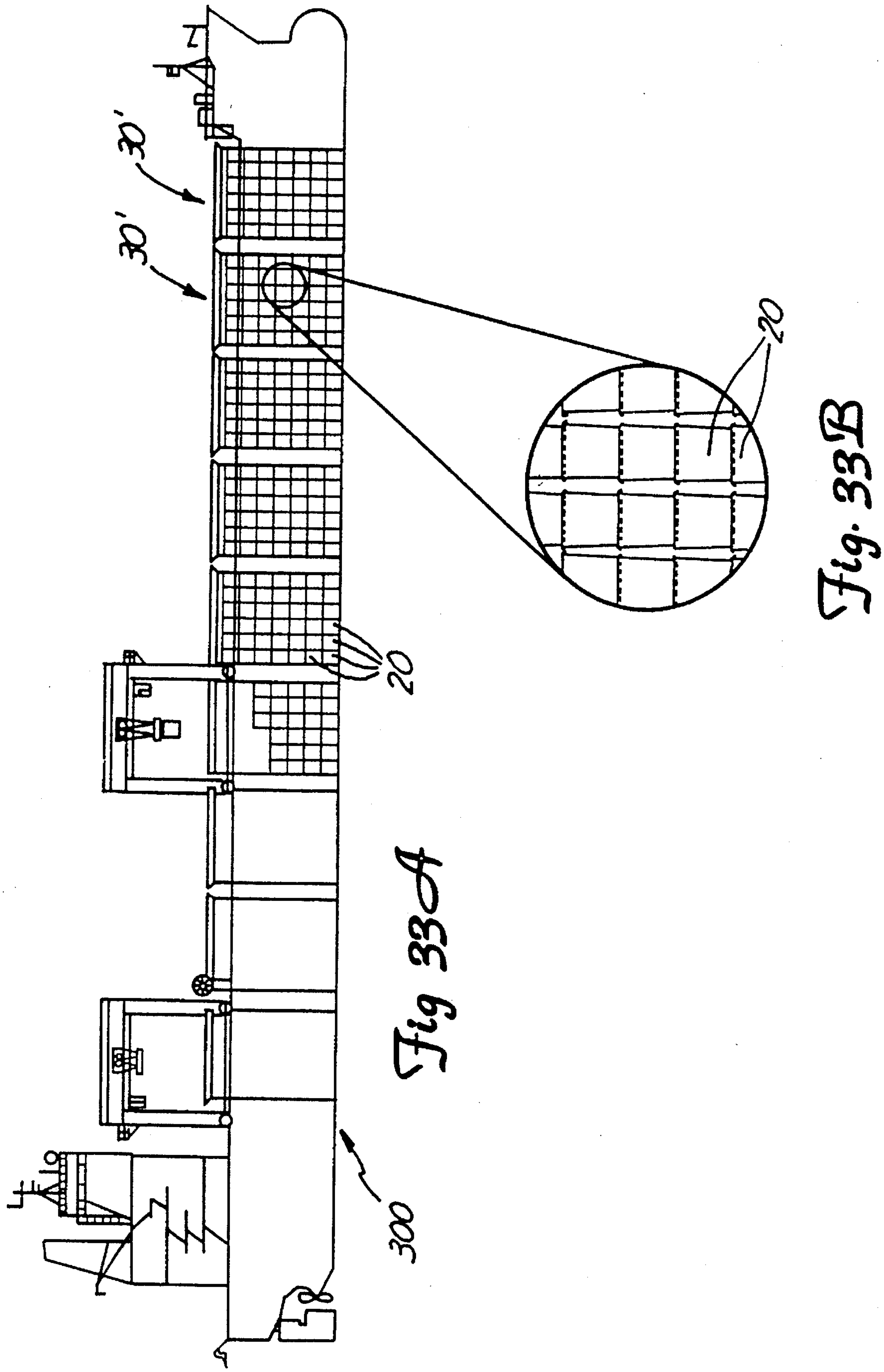
FIG. 33A is cut-away view of a number of containers in a stacked format in a cargo hold of a ship.
FIG. 33B is a close-up view of a number of containers in a stacked configuration in a cargo hold of a ship.

The containers may be stacked when they are filled with materials, as opposed to being nested when they are empty. By stacking the containers 20 when they are filled, the capacity of a train may be doubled without increasing the number of railcars, or the containers may be used to substantially fill the cargo hold of a ship. Referring to FIGS. 33A and 33B, a number of containers 20 may be stacked in the cargo hold 301 of a ship 300. It will be appreciated that the cargo holds 301 may be used to haul bulk materials such as oil or grain when they are not filled with a number of stacked containers. When the cargo holds 301 are filled with bulk materials, the containers 20 may be nested together and stored on the upper deck of the ship 300. Thus, the containers 20 provide a device that allows ships to haul different materials than those for which the ship was designed to haul.

In one embodiment, the container 20 is used to haul MSW from metropolitan centers to large, remotely located processing sites on the backhaul leg of a dedicated train route. The invention may be used to haul almost all of the MSW produced in metropolitan centers along the Eastern Seaboard or West Coast to large regional processing sites in states such as Wyoming, Utah and Montana. The processing sites according to the invention include waste disposal sites, reuse sites and recycling centers.

This embodiment involves first providing a plurality of nestable containers 20 at collection sites in metropolitan centers. Collection sites may include centralized locations in metropolitan centers where MSW is hauled from residential or industrial sources, or the collection sites may be located at a single source of MSW such as a large industrial waste producer. The process continues by filling the nestable containers with MSW at a collection site, and then transporting the filled nestable containers on a railcar to a processing site located remotely from the collection site on the backhaul leg of a rail route. In a preferred embodiment, this process uses a dedicated coal train route in which coal is hauled in gondola railcars from the coal mines to a power plant or other industrial coal user in a metropolitan center, The backhaul leg of the coal route then involves transporting the MSW to a processing site located well out into the countryside where land is inexpensive and available. Once at the processing site, the filled nestable containers are processed according to the function of the processing site.

In the case of hauling MSW, the filled nestable containers are emptied into a landfill or other suitable waste disposal center and are then nested into each other as depicted in FIGS. 12 and 13, and optionally loaded onto flat bed railcars as depicted in FIG. 14. The flatbed railcars carrying a large number of nested containers 20 are then hauled on a minority of railcars of a train back to the collection site.

In one embodiment of the method, the flatbed railcars carrying a large number of nested containers 20 are coupled to the empty train of gondola coal cars in which they were initially loaded and carded to the coal mine where coal cars are filled with coal. The entire train comprising a majority of cars filled with coal and a minority of flatbed cars carrying nested containers 20 then transports the coal and the empty containers 20 on the front haul leg to the metropolitan center. The coal cars are emptied in the metropolitan center and the flatbed cars carrying the nested containers are hauled to the collection site where they are unnested and reloaded with MSW.

In another embodiment, the empty train of gondola coal cars in which the filled containers were initially loaded is transported to the coal mine without being coupled to the flatbed railcars carrying the containers 20. In this embodiment, the flatbed railcars carrying the containers 20 are either coupled to the filled gondola coal cars as they are being hauled from the coal mine back to the metropolitan center, or any other train going to the metropolitan center in which the collection side is located.

The containers 20 may also be hauled on a truck after they are filled at the collection site to a train for loading onto the train. This embodiment is useful for collection sites that are not located near rail lines. Conversely, after the containers have been hauled substantially most of the distance to a processing site on a train or ship, they may be hauled from the rail line to the processing site on a truck. In a preferred embodiment, a truck having positions for at least two containers is provided for hauling the containers between the rail line and the site where the containers are either loaded or unloaded from the trucks. In one embodiment, the truck can carry at one filled container to the processing site in up to half of the positions on the truck. Once at the processing site, empty containers may be lifted onto the open positions on the truck and the filled containers may be unloaded from the truck. The truck is then free to go pick up other filled containers without having to wait for the materials in the container to be discharged from the containers. Although the steps of the embodiment are described as being performed with multiple filled and empty containers, it will be appreciated that the truck may have only two positions in which there is only one filled container and one empty container on the truck at any given time.

In another embodiment, the truck can carry filled containers in all of the positions on the truck from the train or ship to the processing site. Once at the processing site in this later embodiment, all of the filled containers may be unloaded from the truck (which opens all of the positions on the truck), and then all of the empty containers may be loaded onto the truck in the open positions. In this later embodiment, there is generally a plurality of filled containers or empty containers on the truck at any given time.

In yet another embodiment of the method of the invention, non-waste materials are hauled from manufacturers in the containers 20. This embodiment involves first providing a plurality of nestable containers 20 at or near a manufacturing facility, and loading the non-waste materials into the containers. The filled containers are then loaded onto a truck, hauled to a bulk freight carder such as a train or ship, and loaded onto the bulk freight carder. The containers are hauled on the bulk freight carriers to a distribution site where the containers are unloaded from the bulk carder and the non-waste materials are unloaded from the containers. The empty containers may then be refilled or nested together to save space, and then hauled to another destination.

The destination to which the containers are hauled depends upon the type of materials in the containers. In the case of MSW, the containers are hauled to a processing site located some distance away from large cities. In the case of non-waste materials, the containers are hauled to the distribution points of the specific materials.

In order to enhance the nesting and cleanliness of the containers, a thin plastic liner on the order of 1.0–5.0 mm thick may be inserted into the containers. In one method of the invention, a liner may first be placed in the container before it is filled with MSW, and then removed from the container after the MSW has been discharged therefrom. The container is then washed and a new liner is inserted into the container. In another method of the container, the MSW is place in the container and discharged from the container without having a liner in container. The container is then washed and a liner is inserted into the container. Another container is then nested into the lined container. After the containers are separated from each other, the liner is removed and the container is re-filled with MSW.

While a preferred embodiment of the present invention has been described, it should be understood that various changes, adaptations and modifications may be made therein without departing from the spirit of the invention and the scope of the appended claims.

What is claimed is:

1. A method of hauling materials, comprising:

a) providing a plurality of nestable containers at a collection site, each container having a bottom wall, a plurality of sidewalls extending upwardly and being sloped outwardly from the bottom wall to define an interior of the container and each sidewall having an upper perimeter defining an opening that is larger than the bottom wall, a lifting member attached to at least one of the sidewalls, the lifting member having a fitting for engaging a crane and a flange for engaging a vertical wall of a rail car, wherein the bottom wall, sidewalls and lifting member of each container are configured so that the container may be substantially received in another similar container;

b) filling the containers with materials at a collection site;

c) placing the containers in a majority of the rail cars of a train such that the flange rests on an upper surface of a vertical wall of one of said rail cars;

d) transporting the containers in the rail cars to a processing site located remotely from the collection site for at least a distance on the back haul leg of a rail route;

e) lifting the containers out of the rail cars by engaging the fittings of the lifting members with a crane and emptying the containers at the processing site;

f) nesting the empty containers at the processing site so that several empty containers may be carried on a single rail car; and g) hauling the nested empty nestable containers on a minority of the rail cars of the train and non-waste material on a majority of the rail cars of the train back to the collection site.

2. The method of claim 1, further comprising step of trucking the filled containers from the collection site to a rail car.

3. The method of claim 1, wherein a platform is provided and the nesting step further comprises arranging a number of nested containers on their sides so that the bottom walls and opening of the containers are positioned substantially vertically.

4. The method of claim 3, further comprising the step of inserting a number of flexible covers in an open nested container.

5. The method of claim 3, further comprising the step of loading the nested container arranged on their sides on a platform onto a rail car.

6. The method of claim 1, wherein a means for inverting the container is provided at the processing site and the emptying step further comprises inverting filled containers.

7. The method of claim 1, further comprising the step of trucking the filled and transported containers from the train to the processing site.

8. The method of claim 7, wherein a truck having positions for carrying at least two containers is provided and the trucking step further comprises placing at least one filled container on the truck in one of the positions, hauling the filled container to the processing site, loading an empty container at the processing site onto an open position on the truck and unloading the filled container at the processing site.

* * * * *